US012110125B2

(12) United States Patent
Mark et al.

(10) Patent No.: US 12,110,125 B2
(45) Date of Patent: *Oct. 8, 2024

(54) HYBRID ELECTRIC POWERPLANT SYSTEMS AND CONTROLLERS

(71) Applicant: PRATT & WHITNEY CANADA CORP., Longueuil (CA)

(72) Inventors: Michael Mark, Montreal (CA); Paul C. Imel, Hartford, CT (US); Leonid Guerchkovitch, Dollard-des-Ormeaux (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/543,254

(22) Filed: Dec. 18, 2023

(65) Prior Publication Data

US 2024/0116645 A1 Apr. 11, 2024

Related U.S. Application Data

(63) Continuation of application No. 17/001,560, filed on Aug. 24, 2020, now Pat. No. 11,884,412.

(Continued)

(51) Int. Cl.
*B64D 31/06* (2024.01)
*B64D 27/02* (2006.01)
(Continued)

(52) U.S. Cl.
CPC ............. *B64D 31/06* (2013.01); *B64D 27/02* (2013.01); *B64D 27/24* (2013.01); *B64D 31/14* (2013.01);
(Continued)

(58) Field of Classification Search
CPC ........ B64D 21/06; B64D 21/14; B64D 27/02; B64D 27/24; B64D 27/026; B64D 27/30; (Continued)

(56) References Cited

U.S. PATENT DOCUMENTS 8,324,746 B2 12/2012 Bradbrook
11,352,900 B2 * 6/2022 Manoukian ............. F01D 21/14
(Continued)

FOREIGN PATENT DOCUMENTS

EP 3772462 A1 2/2021

OTHER PUBLICATIONS

Great Britain Search Report re: GB application No. GB2013464.9, dated Feb. 24, 2021.

*Primary Examiner* — Jason H Duger
(74) *Attorney, Agent, or Firm* — Norton Rose Fulbright Canada LLP

(57) ABSTRACT

A hybrid electric propulsion (HEP) system can include a heat engine torque sensor connected between a heat engine and a combining gear box to sense a heat motor input torque input to the combining gear box, an electric motor torque sensor connected between an electric motor and the combining gear box to sense an electric motor input torque input to the combining gear box, and a combining gear box torque sensor connected to an output of the combining gearbox. The system can include a HEP controller operatively connected to each of the heat engine torque sensor, the electric motor torque sensor, and the combining gear box torque sensor to receive one or more torque signals therefrom. The controller can be configured to output one or more output signals as a function of the signals from each of the heat engine torque sensor, the electric motor torque sensor, and the combining gear box torque sensor.

8 Claims, 1 Drawing Sheet

Related U.S. Application Data

(60) Provisional application No. 62/892,352, filed on Aug. 27, 2019.

(51) Int. Cl.
    *B64D 27/24*       (2024.01)
    *B64D 31/14*       (2006.01)
    *B64D 45/00*       (2006.01)

(52) U.S. Cl.
    CPC ............ *B64D 45/00* (2013.01); *B64D 27/026* (2024.01); *B64D 2045/0085* (2013.01)

(58) Field of Classification Search
    CPC ........ B64D 27/31; B64D 27/32; B64D 27/33; B64D 27/34; B64D 27/35; B64D 27/351; B64D 27/357; B64D 31/14; B64D 45/00; B64D 2027/026; B64D 2045/0085; F02C 9/00; F02C 9/28; F02C 9/42; F05D 2270/052; B64C 27/57
    See application file for complete search history.

(56) References Cited

U.S. PATENT DOCUMENTS

| | | |
|---|---|---|
| 2009/0056309 A1 | 3/2009 | Roberge |
| 2010/0161247 A1 | 6/2010 | Moeckly |
| 2013/0184959 A1 | 7/2013 | Wendelsdorf |
| 2015/0007666 A1 | 1/2015 | Tucker |
| 2016/0178464 A1 | 6/2016 | Burns |
| 2017/0243413 A1 | 8/2017 | Haggerty |
| 2019/0337629 A1 | 11/2019 | Gilliland |
| 2020/0277063 A1 | 9/2020 | Thomassin et al. |
| 2020/0277066 A1 | 9/2020 | Becker et al. |
| 2020/0339268 A1 | 10/2020 | Mark et al. |

\* cited by examiner

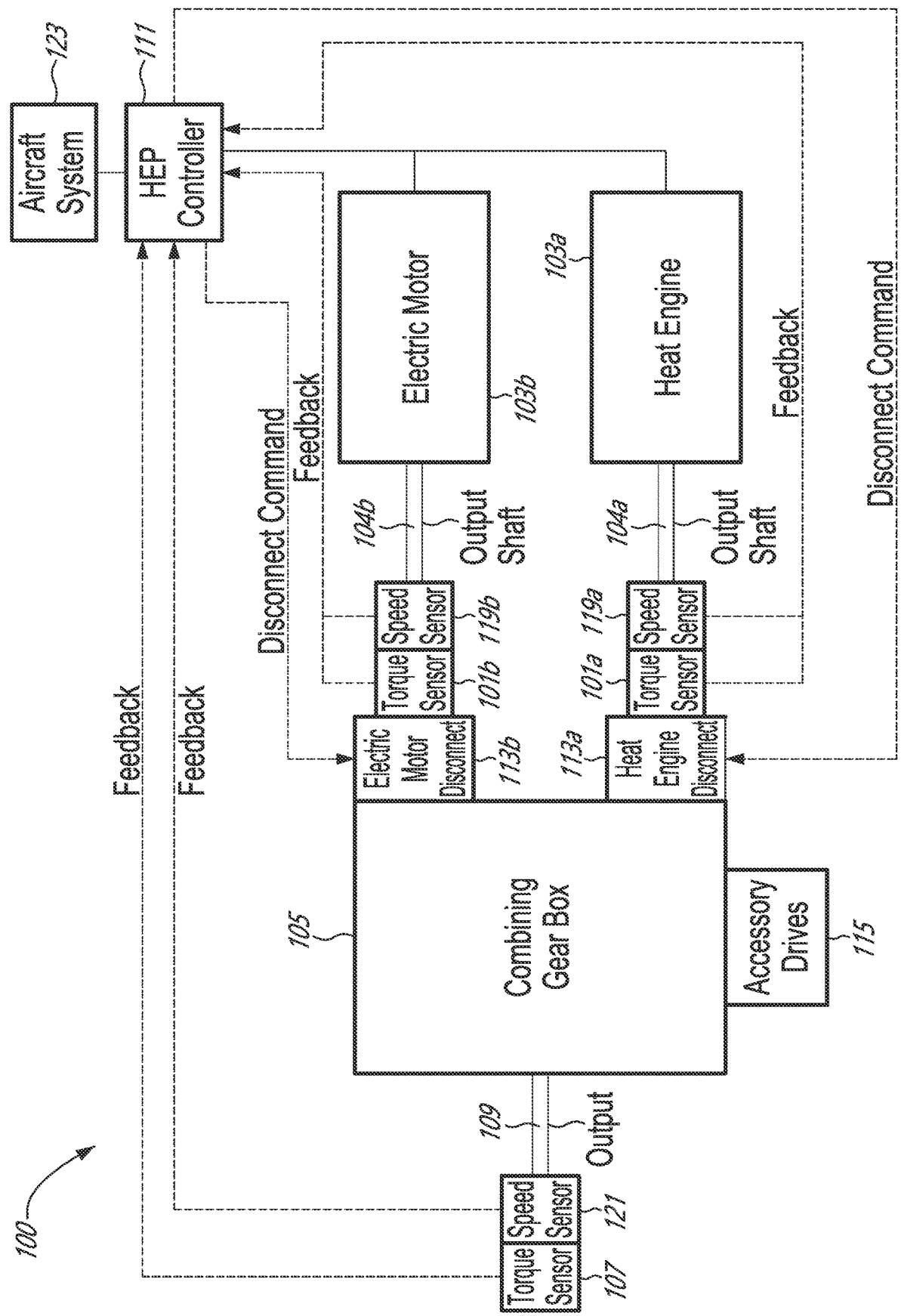

HYBRID ELECTRIC POWERPLANT SYSTEMS AND CONTROLLERS

CROSS REFERENCE TO RELATED APPLICATIONS

This application is a continuation of U.S. patent application Ser. No. 17/001,560 filed on Aug. 24, 2020 and incorporated herein by reference, which claims priority to and the benefit of U.S. Provisional Application No. 62/892,352, filed Aug. 27, 2019, the entire contents of which are herein incorporated by reference in their entirety.

FIELD

This disclosure relates to hybrid electric powerplant systems and controllers (e.g., for aircraft).

BACKGROUND

In aircraft hybrid electric powerplants, the ability to detect and accommodate faults early before resulting in permanent damage to the powerplant and/or a system thereof is desired. For example, improved systems that detect, diagnose, communicate, and/or mitigate against failures would provide improved powerplant control.

Such conventional methods and systems have generally been considered satisfactory for their intended purpose. However, there is still a need in the art for improved hybrid electric powerplant systems and controllers. The present disclosure provides a solution for this need.

SUMMARY

A hybrid electric propulsion (HEP) system can include a heat engine torque sensor connected between a heat engine and a combining gear box to sense a heat motor input torque input to the combining gear box, an electric motor torque sensor connected between an electric motor and the combining gear box to sense an electric motor input torque input to the combining gear box, and a combining gear box torque sensor connected to an output of the combining gearbox. The system can include a HEP controller operatively connected to each of the heat engine torque sensor, the electric motor torque sensor, and the combining gear box torque sensor to receive one or more torque signals therefrom. The HEP controller can be configured to output one or more output signals as a function of the signals from each of the heat engine torque sensor, the electric motor torque sensor, and the combining gear box torque sensor.

In certain embodiments, the system can include a heat engine disconnect disposed between the heat engine and the combining gear box and configured to disconnect the heat engine from the combining gear box. In certain embodiments, the system can include an electric motor disconnect disposed between the electric motor and the combining gear box and configured to disconnect the electric motor from the combining gear box.

The HEP controller can be connected to each of the heat engine disconnect and the electric motor disconnect to control each disconnect as a function of the torque signals from one or more of the heat engine torque sensor, the electric motor torque sensor, and/or the combining gear box torque sensor. In certain embodiments, the HEP controller can be configured such that if the torque signals from the heat engine torque sensor or the electric motor torque sensor indicate that less torque is being provided by the heat engine or the electric motor than is commanded and a health of the heat engine or the electric motor, respectively, is unknown or outside of a normal operating limit, the one or more output signals of the HEP controller include a control signal to control the heat engine disconnect or the electric motor disconnect, respectively, to disconnect the heat engine or the electric motor and a torque command signal to control the other of the heat engine or the electric motor to produce additional torque to attempt to compensate for the disconnected heat engine or electric motor.

In certain embodiments, the HEP controller can be configured such that if the torque signals from the heat engine torque sensor or the electric motor torque sensor indicate that less torque is being provided by the heat engine or the electric motor than is commanded and a health of the heat engine or the electric motor, respectively, is within a normal operating limit, the one or more output signals of the HEP controller include a torque command signal to command the other of the heat engine or the electric motor to produce additional torque to attempt to compensate to meet a commanded total torque. In certain embodiments, the HEP controller can be configured such that if the torque signals from the heat engine torque sensor or the electric motor torque sensor indicate that a commanded torque is being provided by both the heat engine and the electric motor, but one or more signals from the combining gearbox torque sensor indicate that total torque output is less than a commanded total torque, and if a health of both the heat engine and the electric motor are within normal operating limits, the one or more output signals of the HEP controller include maintenance system indicator activation signal to indicate that maintenance is needed to assess a health of the combining gearbox or accessory drives.

In certain embodiments, the HEP controller can be configured such that if the torque signals from the heat engine torque sensor or the electric motor torque sensor indicate that a commanded torque is being provided by both the heat engine and the electric motor, but one or more signals from the combining gearbox torque sensor indicate that total torque output is less than a commanded total torque, and if a health of either of the heat engine or the electric motor are unknown or outside a normal operating limit, the one or more output signals of the HEP controller are configured include a warning indicator activation signal to activate a crew alert system indicator to warn of a HEP level failure leading to a potential HEP shutdown. In certain embodiments, the HEP controller can be configured such that if the torque signals from the heat engine torque sensor or the electric motor torque sensor indicate that less torque is being provided by the heat engine or the electric motor than is commanded, and a trend indicates that the difference between actual torque and commanded torque is growing over time, the one or more output signals of the HEP controller include a warning indicator activation signal to activate a maintenance system indicator to warn that maintenance is needed.

In certain embodiments, the HEP controller can be configured such that if a failure of the heat engine torque sensor or the electric motor torque sensor is determined, the HEP controller is configured to determine a missing torque value as a difference of the heat engine torque sensor or the electric motor torque sensor, whichever is still functioning, and the combining gearbox torque sensor. In certain embodiments, the system can include a speed sensor connected to each location where there is a torque sensor. Each speed sensor can be connected to the HEP controller to provide one or more speed signals to the HEP controller for additional feedback control. For example, the HEP controller can be configured to connect to a speed sensor for each torque sensor to receive one or more speed signals therefrom for additional feedback control.

Any other suitable components for the system to perform any other suitable function are contemplated herein. Any other suitable configuration for the HEP controller to perform any suitable process is contemplated herein.

In accordance with at least one aspect of this disclosure, a hybrid electric powerplant (HEP) controller as disclosed herein, e.g., as described above, can be configured to operatively connect to each of a heat engine torque sensor, an electric motor torque sensor, and a combining gear box torque sensor to receive one or more torque signals therefrom, and to output one or more output signals as a function of the signals from each of the heat engine torque sensor, the electric motor torque sensor, and the combining gear box torque sensor. The HEP controller can be configured in any suitable manner, e.g., as described above.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein:

FIG. 1 is a schematic view of an embodiment of a system in accordance with this disclosure.

DETAILED DESCRIPTION

Reference will now be made to the drawings wherein like reference numerals identify similar structural features or aspects of the subject disclosure. For purposes of explanation and illustration, and not limitation, an illustrative view of an embodiment of a system in accordance with the disclosure is shown in FIG. 1 and is designated generally by reference character 100.

Referring to FIG. 1, a hybrid electric propulsion (HEP) system 100 can include a heat engine torque sensor 101a connected between a heat engine 103a and a combining gear box 105 (e.g., connected to an output shaft 104a of the heat engine 103a) to sense a heat motor input torque input to the combining gear box 105. The system 100 can also include an electric motor torque sensor 101b connected between an electric motor 103b and the combining gear box 105 (e.g., connected to an output shaft 104b of the electric motor 103b) to sense an electric motor input torque input to the combining gear box 105.

The system 100 can include a combining gear box torque sensor 107 connected to an output 109 of the combining gearbox 105. The system 100 can include a HEP controller 111 operatively connected to each of the heat engine torque sensor 101a, the electric motor torque sensor 101b, and the combining gear box torque sensor 107 to receive one or more torque signals therefrom. The HEP controller 111 can be configured to output one or more output signals (e.g., one or more commands, indicator activation signals, and/or any other suitable signals) as a function of the signals from each of the heat engine torque sensor 101a, the electric motor torque sensor 101b, and the combining gear box torque sensor 103. The HEP controller 111 can include any suitable hardware module(s) and/or software module(s) configured to perform and process and/or function disclosed herein.

In certain embodiments, the system 100 can include a heat engine disconnect 113a disposed between the heat engine 103a and the combining gear box 105 and configured to disconnect the heat engine 103a from the combining gear box 105. In certain embodiments, the system 100 can include an electric motor disconnect 113b disposed between the electric motor 103b and the combining gear box 105 and configured to disconnect the electric motor 103a from the combining gear box 105. The respective disconnects 113a, 113b can include any suitable device configured to selectively connect and disconnect two rotating members, for example, and can be connected to the respective output shafts 104a, 104b distal of the torque sensors 101a, 101b (e.g., between the torque sensors 101a, 101b and the combining gear box 105), e.g., as shown. Any other suitable disconnect type and/or position thereof is contemplated herein.

The HEP controller 111 can be connected to each of the heat engine disconnect 113a and the electric motor disconnect 113b to control each disconnect 113a, 113b as a function of the torque signals from one or more of the heat engine torque sensor 101a, the electric motor torque sensor 101b, and/or the combining gear box torque sensor 105. In certain embodiments, the HEP controller 111 can be configured such that if the torque signals from the heat engine torque sensor 101a or the electric motor torque sensor 101b indicate that less torque is being provided by the heat engine 103a or the electric motor 103b than is commanded (e.g., the heat engine input torque input or the electric motor input torque is less than expected) and if a health of the heat engine 103a or the electric motor 103b, respectively (the one producing less torque than commanded), is unknown or outside of a normal operating limit, the one or more output signals of the HEP controller 111 can include a control signal to control the heat engine disconnect 113a or the electric motor disconnect 113b, respectively (the one that is producing less torque than commanded), to disconnect the heat engine 103a or the electric motor 103b, respectively (the one that is producing less torque than commanded). In certain embodiments, in such a circumstance, the output signal can also include a torque command signal to control the other of the heat engine 103a or the electric motor 103b to produce additional torque to attempt to compensate for the disconnected heat engine 103a or electric motor 103b, respectively. In certain embodiments, the HEP controller 111 can be configured such that if the torque signals from the heat engine torque sensor 101a or the electric motor torque sensor 101b indicate that less torque is being provided by the heat engine 103a or the electric motor 103b than is commanded and a health of the heat engine 103a or the electric motor 103b, respectively (the one that is producing less torque than commanded), is within a normal operating limit, the one or more output signals of the HEP controller 111 can include a torque command signal to command the other of the heat engine 103a or the electric motor 103b to produce additional torque to attempt to compensate to meet a commanded total torque.

In certain embodiments, the HEP controller 111 can be configured such that if the torque signals from the heat engine torque sensor 101a or the electric motor torque sensor 101b indicate that a commanded torque is being provided by both the heat engine 103a and the electric motor 103b (e.g., the heat engine input torque input or the electric motor input torque is as expected), but one or more signals from the combining gearbox torque sensor 107 indicate that total torque output is less than a commanded total torque, and if a health of both the heat engine 103a and the electric motor 103b are within normal operating limits, the one or more output signals of the HEP controller 111 can include a maintenance system indicator activation signal to indicate that maintenance is needed to assess a health of the combining gearbox 105 or accessory drives 115, for example. The system 100 can include the maintenance system indicator operatively connected to the HEP controller 111. The maintenance indicator can include any suitable indicator type (e.g., a cockpit light and/or alarm, a manufacturer system indicator). Depending on the application, the signal could be sent to an aircraft system 123 or to an engine/motor-manufacturer system, for example.

In certain embodiments, the HEP controller 111 can be configured such that if the torque signals from the heat engine torque sensor 101a or the electric motor torque sensor 101b indicate that a commanded torque is being provided by both the heat engine 103a and the electric motor 103b, but one or more signals from the combining gearbox torque sensor 107 indicate that total torque output is less than a commanded total torque, and if a health of either of the heat engine 103a or the electric motor 103b are unknown or outside a normal operating limit, the one or more output signals of the HEP controller 111 can include a warning indicator activation signal to activate a crew alert system (CAS) indicator to warn of a HEP level failure leading to a potential HEP shutdown. The system 100 can include the CAS indicator operatively connected to the HEP controller 111. The CAS indicator can include any suitable indicator type (e.g., a cockpit light and/or alarm). In certain embodiments, the controller 111 can be configured to automatically shut down each of the heat engine 103a and the electric motor 103b in such a circumstance additionally to or instead of sending a warning indicator activation signal (e.g., in autonomous aircraft operations).

In certain embodiments, the HEP controller 111 can be configured such that if the torque signals from the heat engine torque sensor 101a or the electric motor torque sensor 101b indicate that less torque is being provided by the heat engine 103a or the electric motor 103b than is commanded, and a trend indicates that the difference between actual torque and commanded torque is growing over time (e.g., torque output is dropping over time by one or both of the heat engine 103a or electric motor 103b), the one or more output signals of the HEP controller 111 can include a warning indicator activation signal to activate a maintenance system indicator to warn that maintenance is needed. The system 100 can include the CAS indicator operatively connected to the HEP controller 111. The CAS indicator can include any suitable indicator type (e.g., a cockpit light and/or alarm).

In certain embodiments, the HEP controller 111 can be configured such that if a failure of the heat engine torque sensor 101a or the electric motor torque sensor 103a is determined, the HEP controller 111 can be configured to determine a missing torque value as a difference of the heat engine torque sensor 101a or the electric motor torque sensor 101b, whichever is still functioning, and the combining gearbox torque sensor 107. This allows a subtraction of total torque from one of the remaining torque lane(s) to calculate the missing torque value).

The system 100 can include a speed sensor 119a, 119b, 121 connected to each location where there is a torque sensor 101a, 101b, 107. Each speed sensor can be connected to the HEP controller 111 to provide one or more speed signals to the HEP controller 111 for additional feedback control (e.g., overspeed protection and/or to determine if disconnect mechanism is engaged). For example, the HEP controller 111 can be configured to connect to each speed sensor 119a, 119b, 121 to receive one or more speed signals therefrom, and to determine any suitable condition and take any suitable action (e.g., disconnect) based on the one or more speed signals.

Any other suitable components for the system 100 to perform any other suitable function are contemplated herein. Any other suitable configuration for the HEP controller 111 to perform any suitable process is contemplated herein (e.g., to determine torque based on the torque signals of each sensor, to determine speed based on speed sensor signals, to process signals to determine the health of or faults in one or more the heat engine 103a, the electric motor 103b, sensors 101a, 101b, 107, 119a, 119b, 121, to determine if torque is low or high at any location, to determine if power compensation is possible by other torque lane and to send a warning indicator activation signal if not). The HEP controller 111 can provide output to one or more aircraft systems 123, e.g., for cockpit indication (e.g., ICAS, cockpit display, etc.) for the pilot to review.

In accordance with at least one aspect of this disclosure, a hybrid electric powerplant (HEP) controller as disclosed herein, e.g., HEP controller 111 as described above, can be configured to operatively connect to each of a heat engine torque sensor, an electric motor torque sensor, and a combining gear box torque sensor to receive one or more torque signals therefrom, and to output one or more output signals as a function of the signals from each of the heat engine torque sensor, the electric motor torque sensor, and the combining gear box torque sensor. The HEP controller can be configured in any suitable manner, e.g., as described above.

For certain parallel hybrid electric propulsion systems, a heat motor and an electric motor can provide torque input to a combining gearbox. Embodiments allow measuring two inputs (e.g., the output of each power lane) and one output (e.g., the output of combining gearbox) which can allow precise fault detection to determine a cause of a fault and to take appropriate corrective or indicative steps. Embodiments can include a mechanical disconnect mechanism for each torque input lane, and a speed sensor on the motor side can be used to determine if a mechanical disconnect is engaged.

Embodiments can provide the ability to detect abnormal events, faults, and failures and isolate source of abnormal event such as lower measured torque than requested at any of the measured torque locations and/or engine abnormal events causing lower measured torque. Embodiments can accommodate a detected fault based on severity of system-level effect and can shut down and/or disconnect torque lane, compensate by commanding higher power from other torque lane to meet HEP requested power and/or compensating with other aircraft propulsion sources, notify flight crew via a CAS message on the fault detected. Embodiments can allow accommodation to be automated by the HEP controller or based on pilot command.

Embodiments can provide output to one or more aircraft systems. For example, embodiments can provide output to health monitoring systems for future maintenance actions. Certain embodiments can include such health monitoring systems. Embodiments can prevent high impact hardware failures through early detection and/or provide mitigation by shutting down the motor. Embodiments can provide a greater potential for propulsion system torque availability by compensating power from the other torque lane when one torque lane is in a partially degraded state while the degraded motor is within normal operating limits (e.g. due to temperature limits, pressure limits, vibration limits, etc.)

Embodiments can also provide redundancy of torque measurements. When torque measurement is lost from one lane, torque measurement can be synthesized from the remaining, e.g., two other, torque readings.

As will be appreciated by those skilled in the art, aspects of the present disclosure may be embodied as a system, method or computer program product. Accordingly, aspects of this disclosure may take the form of an entirely hardware embodiment, an entirely software embodiment (including firmware, resident software, micro-code, etc.), or an embodiment combining software and hardware aspects, all possibilities of which can be referred to herein as a "circuit," "module," or "system." A "circuit," "module," or "system" can include one or more portions of one or more separate physical hardware and/or software components that can together perform the disclosed function of the "circuit," "module," or "system", or a "circuit," "module," or "system" can be a single self-contained unit (e.g., of hardware and/or software). Furthermore, aspects of this disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of this disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the this disclosure may be described above with reference to flowchart illustrations and/or block diagrams of methods, apparatus (systems) and computer program products according to embodiments of this disclosure. It will be understood that each block of any flowchart illustrations and/or block diagrams, and combinations of blocks in any flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in any flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. A hybrid electric powerplant (HEP) controller configured to operatively connect to each of a heat engine torque sensor, an electric motor torque sensor, and a combining gear box torque sensor to receive torque signals from the heat engine torque sensor, the electric motor torque sensor and the combining gear box torque sensor, wherein the controller is configured to output one or more output signals as a function of the torque signals from the heat engine torque sensor, the electric motor torque sensor and the combining gear box torque sensor, wherein:
   the HEP controller is connected to a heat engine disconnect configured to disconnect a heat engine from a combining gear box and to an electric motor disconnect configured to disconnect an electric motor from the combining gear box, to control the heat engine disconnect and the electric motor disconnect;
   the HEP controller is configured to:
      detect a fault when one or more of the torque signals indicate that less torque is being provided by the heat engine or the electric motor than is commanded; and
      when the fault is detected, control the heat engine disconnect or the electric motor disconnect to disconnect one of the heat engine or the electric motor from the combining gear box.

2. The HEP controller of claim 1, wherein the HEP controller is configured to, when a health of the heat engine or the electric motor, respectively, is unknown or outside of a normal operating limit, control the other of the heat engine or the electric motor to produce additional torque to attempt to compensate for the disconnected heat engine or electric motor when the fault is detected.

3. The HEP controller of claim 1, wherein the HEP controller is configured to command the other of the heat engine or the electric motor to produce additional torque to attempt to compensate to meet a commanded total torque when the fault is detected.

4. The HEP controller of claim 1, wherein the HEP controller is configured such that when a first torque signal from the heat engine torque sensor or a second torque signal from the electric motor torque sensor indicate that a commanded torque is being provided by both the heat engine and the electric motor, but a third torque signal from the combining gear box torque sensor indicates that total torque output is less than a commanded total torque, and when a health of both the heat engine and the electric motor are within normal operating limits, the one or more output signals of the HEP controller include a maintenance system indicator activation signal to indicate that maintenance is needed to assess a health of the combining gear box or accessory drives.

5. The HEP controller of claim 1, wherein the HEP controller is configured such that when a first torque signal from the heat engine torque sensor or a second torque signal from the electric motor torque sensor indicate that a commanded torque is being provided by both the heat engine and the electric motor, but a third torque signal from the combining gear box torque sensor indicates that total torque output is less than a commanded total torque, and when a health of either of the heat engine or the electric motor are unknown or outside a normal operating limit, the one or more output signals of the HEP controller include a warning indicator activation signal to activate a crew alert system indicator to warn of a failure leading to a potential shutdown.

6. The HEP controller of claim 1, wherein the HEP controller is configured such that when a trend indicates that a difference between actual torque and commanded torque is growing over time, the one or more output signals of the HEP controller include a warning indicator activation signal to activate a maintenance system indicator to warn that maintenance is needed.

7. The HEP controller of claim 1, wherein the HEP controller is configured such that when a failure of the heat engine torque sensor or the electric motor torque sensor is determined, the HEP controller is configured to determine a missing torque value as a difference between a first torque value from the heat engine torque sensor or the electric motor torque sensor, whichever is still functioning, and a second torque value from the combining gear box torque sensor.

8. The HEP controller of claim 1, the HEP controller is configured to connect to a speed sensor for each torque sensor to receive one or more speed signals therefrom for feedback control.

* * * * *